March 10, 1936.   J. H. MEINECKE   2,033,530
ARTIFICIAL FISHING FLY
Filed Aug. 28, 1934
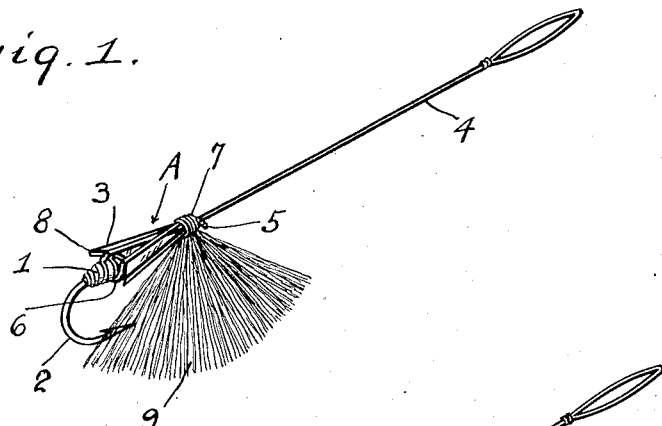
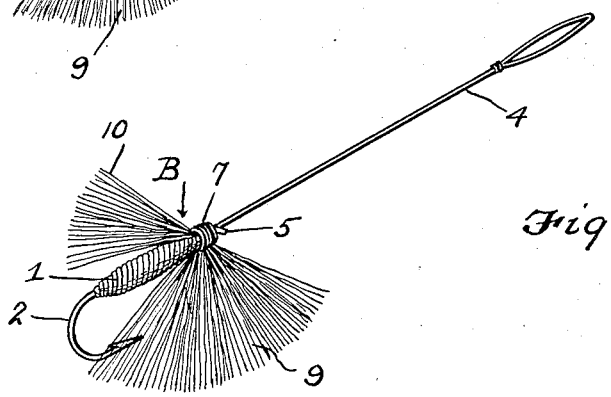
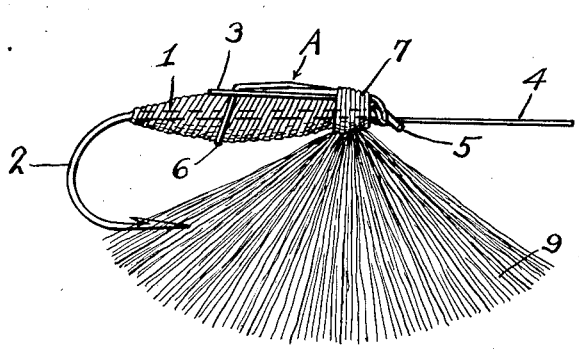
Inventor
JOHN HARRY MEINECKE, Deceased
LUCILLE MEINECKE, Administratrix.
By Clarence A. O'Brien
Attorney Patented Mar. 10, 1936

2,033,530

UNITED STATES PATENT OFFICE 2,033,530

ARTIFICIAL FISHING FLY

John Harry Meinecke, deceased, late of Butte, Mont., by Lucille Meinecke, administratrix, Butte, Mont.

Application August 28, 1934, Serial No. 741,860

3 Claims. (Cl. 43—48)

This invention relates to an artificial fishing fly, the general object of the invention being to provide a fly that will greatly resemble the insect which it is to represent. In the case of representations of insects with wings, the fly is provided with transparent wings so as to most nearly represent the insect copied. In the case of both the transparent wing and the hair fly, the body is coated with waterproofing material. In the case of both the transparent wing and the hair flies, the body is constructed with a plurality of hairs tied in a fan shape or half circle below the head of the fly and projecting below the body so as to simulate the legs of an insect, which also acts to prevent the fly from hooking to and snagging on weeds, brush, etc., that might be in the water and also to prevent catching in the clothing of the fisherman and brush, weeds, etc., behind the fisherman in the act of casting.

Hair is placed in a fan shape or half circle so that when the fly is placed in the water and is being drawn or jerked through the water, such action, or the current of the water on the fan-shaped hair legs makes a natural life-like appearance, which makes it appear as the struggling legs of a live fly. Hair placed in this fashion hides the point of the hook without interfering with the life-like appearance of the fly.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1 is a perspective view of the winged type of fly.

Figure 2 is an elevation thereof.

Figure 3 is a view of the hair type of fly.

In these views, the numeral 1 indicates the body of the artificial fly through which the shank of the hook 2 passes. The body is made to represent the insect which it is desired to imitate. The wings 3 are formed of a piece or multiple pieces of "celluloid," "cellophane" or the like, and of such shape as to represent wings. These wings are fastened to the body by arranging the end of the leader 4 or a piece of silk or silk worm gut, half hitched through the eye 5 of the hook, up over the top of the wing, down around the body, as shown at 6, then back over the top of the wing and back to the eye of the hook and there fastened with a wrapping 7 which forms the head of the fly and then the fly is dressed with waterproofed dressing. For the purpose of receiving the leader, silk or silk worm gut, the wing is notched at the posterior end, as shown at 8, thus combining a natural appearance with the formation of a groove to receive the leader, silk or silk worm gut in its manner of wrapping and thus holding the wings in place. The waterproof dressing is preferably made by dissolving "celluloid" with acetone of proper consistency and the body and head of the fly are treated with the solution which will give the body a hard glossy coating, which will not discolor in the water and will continue to resemble the natural fly.

The transparent wing, fastened to the body as above described is prevented from slipping sideways or out of position and when the fly is placed in the water and manipulated through the current, it causes the fly to roll and twist, and causes a flashing attraction by the reflection of light on the transparent wing.

The hairs 9 are attached to the head of both the transparent wing fly, shown at A and the hair fly, shown at B, in a fan-shaped form emanating from the head of the fly and extending downwardly in a fan-shaped manner, and in the case of hair flies, other hairs 10 extend above the body from the head of the fly to represent wings. The hairs 9 are held in place by the wrapping 7 which forms the head of the lure, the wrapping passing around the central portion of the hairs, so that the hairs extend in a fan-shape under the body. The extension of the hairs 9 in a fan-shaped manner below the head of the fly present the appearance of legs of an insect and also act to prevent the fly from hooking to or snagging on weeds, brush, or the clothing of the fisherman in the act of casting or handling. When the fly is placed in the water and drawn through the water, or acted on by the current in the water, the effect on the fan-shaped hairs creates a natural, life-like appearance which makes it appear as the struggling legs of a live fly and it also hides the point of the hook.

The body 1 is formed of material wrapped upon itself and is treated with the waterproofed dressing, which produces a hard, glossy coating over the fly body and protects it and keeps it from coming apart as the coating prevents the material from untying, unwrapping, etc., and it protects the body of the fly from the sharp teeth of the fish and from wear and tear when being cast over or against brush, trees, rocks, etc. The dressing also helps hold the wing and hair hackle firm, and prevents the wing and hackle from slipping and this dressing can be colored to obtain a color that cannot be obtained by using different colors of thread. The combination of the dressing with the method of fastening renders the fly practically indestructible.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:

1. A fish lure comprising a hook, a body through which the shank of the hook passes, said body being in the form of an insect, a waterproof dressing on the body, hairs connected with the body beneath the head thereof and extending in fan shape longitudinally of the body and below the body, wings of transparent material attached to the head end of the body and folding over the body, said wings being formed of a single piece or multiple pieces of "celluloid", "cellophane", or the like tapering forwardly and having the small front end fastened to the head of the body, with the rear end notched, a flexible member passing through the eye of the hook and then passing rearwardly over the wing forming member through the notch, then around the rear of the body and up through the notch and back over the wing member, and means for fastening the end of the member to the head of the body.

2. A fish lure comprising a hook, a body through which the shank of the hook passes, waterproof dressing for the body, a bunch of hairs, means for tying the central portion of the bunch to the head of the body with the hairs extending in fan-shape under the body and toward the hook, and forwardly from the head of the body, and a wing forming member of transparent material and tapering forwardly with its front, small end resting on the top of the head and front part of the body and held in place by the means which tie the hairs to the body.

3. A fish lure comprising a hook, a body through which the shank of the hook passes, waterproof dressing for the body, a bunch of hairs, means for trying the central portion of the bunch to the head of the body with the hairs extending in fan-shape under the body and toward the hook, and forwardly from the head of the body, a wing forming member of transparent material and tapering forwardly with its front, small end resting on the top of the head and front part of the body and held in place by the means which tie the hairs to the body, and a leader having a half hitch in the eye of the hook, with a portion extending over the wing member, through a notch at the rear end of the wing member, then around the body and up through the notch and back over the wing member and under the means which tie the hairs to the body.

LUCILLE MEINECKE,
*Administratrix of the Estate of John Harry Meinecke, Deceased.*